May 18, 1943
W. W. HECKETHORN
2,319,681
LENS BOARD LOCK FOR CAMERAS
Filed Nov. 8, 1941
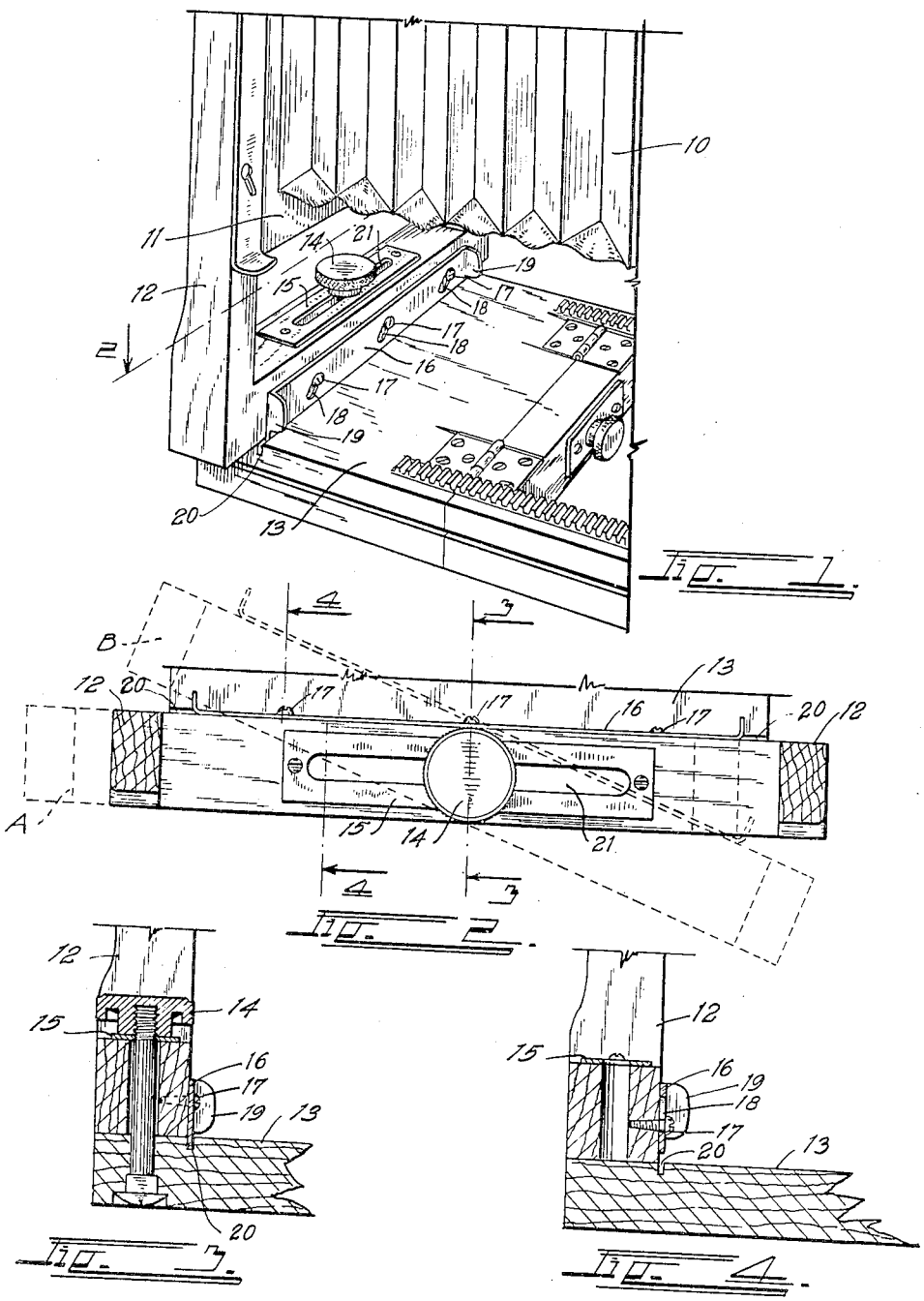
INVENTOR.
WILLIAM W. HECKETHORN.
BY Patented May 18, 1943

2,319,681

UNITED STATES PATENT OFFICE 2,319,681

LENS BOARD LOCK FOR CAMERAS

William W. Heckethorn, Littleton, Colo.

Application November 8, 1941, Serial No. 418,309

1 Claim. (Cl. 95—50)

This invention relates to a camera lens board locking device and has for its principal object the provision of an exceedingly simple mechanism which will accurately hold the lens board at right angles to the optical axis of the camera, yet allow the board to be shifted to the right or left and which can be instantly released to allow the lens board to be swung at any desired angle to the optical axis.

Other objects and advantages reside in the detail construction of the invention, which is designed for simplicity, economy, and efficiency. These will become more apparent from the following description. In the following detailed description of the invention reference is had to the accompanying drawing which forms a part hereof. Like numerals refer to like parts in all views of the drawing and throughout the description.

In the drawing:

Fig. 1 is a fragmentary, perspective view of a portion of a typical view camera illustrating the invention in place thereon;

Fig. 2 is an enlarged, horizontal section, taken on the line 2—2, Fig. 1, looking downwardly;

Fig. 3 is a cross section, taken on the line 3—3, Fig. 2; and

Fig. 4 is a cross section, taken on the line 4—4, Fig. 2.

Typical parts of a camera are designated by numeral as follows: bellows 10, lens board 11, lens board frame 12, track board 13, lens frame clamp screw 14, clamp screw plate 15. By loosening the clamp screw 14, the lens board frame 12 can be moved from side to side, there being a slotted screw opening 21 in the plate 15. The lens board frame can also be turned about the screw 14 as a pivot point.

Attempts have been made to provide a guide for the sideward movement of the lens board by placing a plate on the front of the frame 12 which would over-lap the front of the track board 13. Such a construction is not satisfactory, however, since it does not uniformly maintain the lens board at the exact right angle position. There is always more or less looseness in the plate, since it must be slidably mounted on the lens board frame, and there is always more or less inaccuracy between the end of the track board and the frame. Therefore there is no positive assurance that the lens board is in an accurate 90° position with the optical axis.

This invention has been designed to maintain this exact angle regardless of any looseness in the attachment plates on its screws, etc.

The invention comprises a flat, vertically positioned locking plate 16 which is held against the rear surface of the bottom horizontal member of the lens board frame 12 by means of suitable attachment screws 17. These screws pass through inclined slotted openings 18 in the plate 16. These slotted openings cause the plate to raise when it is forced in one direction and to descend when it is forced in the other direction. The forcing of the plate is facilitated by means of finger tabs 19 which are turned outwardly at both the extremities of the plate.

A narrow, plate-receiving channel 20 is cut across the upper surface of the track board 13 immediately below the plate 16. This channel is positioned accurately at right angles to the optical axis of the camera and has a width accurately corresponding to the gauge or thickness of the plate 16.

When the plate is forced in one direction, its lower edge descends into the channel 20 throughout its entire length and, since the channel equals the thickness of the plate, there can be no turning motion of the latter. The channel is in direct alignment with the rear face of the lens board frame 12 so that the latter contacts the plate throughout its entire length regardless of any tightness or looseness of the attachment screws 17. Therefore, the lens board frame cannot swing regardless of its lateral position.

It will be noted that if this same plate were placed on the front of the lens board frame so that it contacted the front of the track board, its entire accuracy would be dependent upon the relative tightness or looseness of its attachment screws.

If the lens board is to be moved sidewardly but not to be turned at an angle, the plate remains in its channel 20 and slides therealong, as indicated in broken line at A, in Fig. 2. If the lens board is to be turned at an angle, the plate is moved sidewardly to elevate it from the channel 20 so that the frame may be swung, as indicated at B in Fig. 2.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A guiding and locking device for cameras of the type having a pivoted, laterally movable lens board frame mounted on a track board comprising: a plate resting in a channel cut across the upper surface of said track board in alignment with the rear face of said frame, said channel having a width equalling the thickness of said plate to prevent sideward movement of the latter; and means for lifting said plate from said channel when desired.

WILLIAM W. HECKETHORN.